US012132713B1

(12) United States Patent  (10) Patent No.: US 12,132,713 B1
Dodge  (45) Date of Patent: *Oct. 29, 2024

(54) CONTENT VALIDATION NETWORK AND ASSOCIATED METHODS

(71) Applicant: Andrew S. Dodge, Auburn, WA (US)

(72) Inventor: Andrew S. Dodge, Auburn, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,592

(22) Filed: Oct. 23, 2023

Related U.S. Application Data

(63) Continuation of application No. 17/990,665, filed on Nov. 19, 2022, which is a continuation-in-part of application No. 17/592,569, filed on Feb. 4, 2022, now abandoned.

(60) Provisional application No. 63/254,805, filed on Oct. 12, 2021.

(51) Int. Cl.
  *H04L 29/06*  (2006.01)
  *H04L 9/40*  (2022.01)

(52) U.S. Cl.
  CPC ...... *H04L 63/0442* (2013.01); *H04L 63/0823* (2013.01)

(58) Field of Classification Search
  CPC .......................... H04L 63/0442; H04L 63/0823
  See application file for complete search history.

(56) References Cited

U.S. PATENT DOCUMENTS

| 6,356,903 B1* | 3/2002 | Baxter | G06F 40/131 707/999.1 |
| 6,389,403 B1* | 5/2002 | Dorak, Jr. | H04L 67/52 705/52 |
| 7,802,306 B1* | 9/2010 | Adams | G11B 20/00086 726/28 |
| 9,053,190 B1* | 6/2015 | Boenau | G06F 16/9535 |
| 9,547,879 B1* | 1/2017 | Rakowicz | H04L 9/3247 |

(Continued)

OTHER PUBLICATIONS

Laurence Bull et al., Content Extraction Signatures using XML Digital Signatures and Custom Transforms On-Demand, May 20, 2003, ACM, pp. 170-177. (Year: 2003).*

(Continued)

*Primary Examiner* — Luu T Pham
*Assistant Examiner* — Fahimeh Mohammadi
(74) *Attorney, Agent, or Firm* — AEON Law, PLLC; Adam L. K. Philipp; Ki Yong O

(57) ABSTRACT

Described is a content validation network including a certificate generation engine, a signature engine, a display engine, a certificate status engine, and a digital content card. The certificate generation engine includes a key pair generator to create a user's public and private key producing a digital certificate authenticating a user. The certificate generation engine embeds the public key into the digital certificate. The signature engine generates the user's digital signature unique to their digital content card when validated by their digital certificate. The display engine validates the user's digital signature using their digital certificate then displays the users created digital content card with the user's digital signature embedded into metadata elements of the digital content card. The certificate status engine determines whether the digital signature of the user's digital content card is valid. The digital content card is content created by the user demarcated with a conspicuous border and the user's identity.

19 Claims, 10 Drawing Sheets

(56) References Cited

U.S. PATENT DOCUMENTS

| | | | | |
|---|---|---|---|---|
| 2001/0002485 A1* | 5/2001 | Bisbee | ............... | G07F 7/12 705/51 |
| 2002/0099938 A1* | 7/2002 | Spitz | ............... | H04L 9/3247 713/155 |
| 2002/0138744 A1* | 9/2002 | Schleicher | ......... | H04L 63/0823 713/176 |
| 2003/0158823 A1* | 8/2003 | Fulton | ............... | H04L 9/3247 705/75 |
| 2003/0217164 A1* | 11/2003 | Cai | ............... | G06F 21/64 707/999.009 |
| 2004/0003248 A1* | 1/2004 | Arkhipov | ............... | H04L 9/3247 713/170 |
| 2006/0206712 A1* | 9/2006 | Dillaway | ............... | H04L 9/3265 713/176 |
| 2008/0148054 A1* | 6/2008 | Cahill | ............... | G06F 21/64 713/180 |
| 2008/0307301 A1* | 12/2008 | Decker | ............... | G06F 16/9577 715/241 |
| 2011/0296171 A1* | 12/2011 | Fu | ............... | H04L 9/0825 709/206 |
| 2012/0030774 A1* | 2/2012 | Keith | ............... | H04L 63/0428 726/30 |
| 2012/0066757 A1* | 3/2012 | Vysogorets | ............... | G06F 21/34 726/9 |
| 2014/0032927 A1* | 1/2014 | Das | ............... | H04L 9/3268 713/189 |

OTHER PUBLICATIONS

Sufyan Ababneh et al., Compensated Signature Embedding for Multimedia Content Authentication, Dec. 1, 2009, ACM, vol. 1, Issue 3, pp. 17-17.20. (Year: 2009).*

Tobias Kuhn et al., Making Digital Artifacts on the Web Verifiable and Reliable, Sep. 1, 2015, IEEE, vol. 27, Issue: 9, pp. 2390-2400. (Year: 2015).*

Manpreet Singh et al., Digital Signature Verification Scheme for Image Authentication, Apr. 19, 2016, IEEE, pp. 1-5. (Year: 2016 ).*

* cited by examiner

Content Card Backend Attributes 700

HTML Element Content- (Content Card Backend) 391

```
<div class="CVN_ArtTag"                                                         —391a
data-cvn_artid="A372A45C4-1DD2-11B2-97A8-E63BF992BF992"                         —391b
data-cvn_artdate="July 16th, 2020 19:43:59 GMT"                                 —391c
data-cvn_authid="D2ABB0A3A-1DD2-11B2-92C4-E63BF992BF992"                        —391d
data-cvn_authkey="authorbase64encodedkeyhere"                                   —391e
data-cvn_authsgn="authorbase64articlesignaturehere"                             —391f
data-cvn_entid="E2ABB0A3C-1DD2-11B2-92C4-E63BF997BF997"                         —391g
data-cvn_entkey="entitybase64encodedkeyhere"                                    —391h
data-cvn_entsgn="entitybase64articlesignaturehere"                              —391i
style="display: inline-block;">Content To be Displayed<div>
```

FIG. 7A

HTML Element Content- (Content Card Backend) 391

```
<div class="CVN_ArtTag"                                                         —391a
data-cvn_artid="A372A45C4-1DD2-11B2-97A8-E63BF992BF992"                         —391b
data-cvn_artdate="July 16th, 2020 19:43:59 GMT"                                 —391c
data-cvn_authid="D2ABB0A3A-1DD2-11B2-92C4-E63BF992BF992"                        —391d
data-cvn_authkey="authorbase64encodedkeyhere"                                   —391e
data-cvn_authsgn="authorbase64articlesignaturehere"                             —391f
data-cvn_auth2id="D2ABB0A3A-1DD2-11B2-92C4-E63BF992BF992"
data-cvn_auth2key="authorbase64encodedkeyhere"                                  —391k
data-cvn_auth2sgn="authorbase64articlesignaturehere"
data-cvn_entid="E2ABB0A3C-1DD2-11B2-92C4-E63BF997BF997"                         —391g
data-cvn_entkey="entitybase64encodedkeyhere"                                    —391h
data-cvn_entsgn="entitybase64articlesignaturehere"                              —391i
data-cvn_ent2id="E2ABB0A3C-1DD2-11B2-92C4-E63BF997BF997"
data-cvn_ent2key="entitybase64encodedkeyhere"                                   —391l
data-cvn_ent2sgn="entitybase64articlesignaturehere"
data-cvn_crtsts="base64servercertificatevalidation"                             —391j
oncopy="event.clipboardData.setData('text/
plain',this.outerHTML);event.preventDefault();"
style="display: inline-block;">Content To be Displayed<div>
```

FIG. 7B

Content Card Backend Example 800

```
<div class="dVN_ArtTag" data-cvn_artid="A1C96F90A-1DD2-11B2-8781-E14FA21EFA21E" data-
cvn_artdate="August 9th, 2021 16:56:15 GMT" data-cvn_authid="C2FFB9762-1DD2-11B2-8ABD-E14FA21EFA21E"
data-
cvn_authkey="SIIK8wIBAAIBAjCCCukwggTQMIIDf6ADAgECAhQAhISAMAGh8h3SEbKTZVJUAAUSIzBGBgkqhkiG9w0BAQowOaAPM
A0GCWCGSAF1AwQCAQUAoRwwGgYJKoZIhvcNAQEIMA0GCWCGSAF1AwQCAQUAogMCASCjAwIBATCBnDELMAkGA1UEBhMCVVMxEDAOBgN
VBAgTB0Zsb3JpZGExFzAVBgNVBAcTDkNhcGUgQ2FuYXZlcmFsMRgwFgYDVQQKEw9UcnVzdCBUaGUgUHJlc3MxSDBGBgNVBAMTP1Ryd
XN0IFRoZSBQcmVzcyBSb290IENlcnRpZmljYXRlIDEgSW50ZXJtZWRpYXRlIFNlcnZlciAxIC0gMjAyMDAiGA8yMDIxMDIwNzIwMzA
0N1oYDzIwMjIwMjA4MjAzMDQ3WjBVMQswCQYDVQQGEwJVUzEVMBMGA1UEAxMQW5kcmVJIERvZGdlMS8wLQYDVQQFEyZDMkZGQjk3N
jItMUREMi0xMUIyLThBQkQtRTE0RkEyMUVGQTIxRTCCASIwDQYJKoZIhvcNAQEBBQADggEPADCCAQoCggEBAP////44d9x7/
V2rMWIstTYX1hazpt1HXGnWmbDDExJGp0xahXJ7hD0yG6VhlirA9hBQ5iVJxrf6sNdU6yFttBsVTevAmPswI9PykBJktCcZCt27ZxL
Fhyc+1pnLufx2UTWHdGwOlmEDiHbJJs2eGctw00CTMSHJK722TinglrcXOz6S65wWr3x5Am68AAxl95swHmC/
QdMLU2jB0ncaADgrESnvimerbPzBUSWL+w+dOWF/I/
z78AhvAZj8ltBzezEZj5TVTds4Fvi0WLo53+iV9uBGcoxkJM9CxClWlfkJQ6WYwCpUHjfh3pGheqsj7UP8Q5vWxLZ9tTWcXqZECAwE
AAaOB2TCB1jAXBgNVHREEEDAOggxBbmRyZXcgRG9kZ2UwCwYDVR0PBAQDAgHxMAkGA1UdEwQCMAAwKQYDVR0OBCBIEIOtJKmqPYAzHd
FgSmG1KL30Y8mc9DT31E0sWvjPpIPOEMCsGA1UdIwQkMCKAIIyZfg0TYVJChLnrpeovePG0HPvTiWFm23OaltlKxd8oMEsGCCsGAQU
FBwEBBD8wPTA7BggrBgEFBQcwAYYvaHR0cDovL2RldlRlcHJlc3MuY29tL2NvbW1vbi9Vc2VycyOvmLpcmVzL2NvbW1vbi9VcmUvFRQXlNydlJzcC5waHAwRgYJKoZIh
vcNAQEKMDmgDzANBglghkgBZQMEAgEFAKEcMBoGCSqGSIb3DQEBCDANBglghkgBZQMEAgEFAKIDAgEgowMCAQEDggEBAGeMoVyIkXu
ri0OkoNqtRRMHD7AFuJYshyts7IdpoQDquoEVSb72oILp6/
gexialhur6XxjikV+LEuy8KbOHE9pg8OlONxIH4YIeDsZAaDnxInFPiyFyHhvl11R03a43pZTUZqEAbP3Zu6XHCyLYouipaKeb5e01
Nfq/PhK8Wmtb+IBUsoijjHDLVsdgNE6/s7Yq5gvk+HDg/TTU5dUhf5n9xwZyb4/dAglqiDVowaGM2B/
iazhvDBrlB372wws59adCTiosyeh0PjCXFGFSUFLD7o/
97A9dKJ32bMlKkAwWxriuqsXgLf8kjuvjxs8EHYIGCOQh+jVZGwPzACcQmPwwggYRMIIDwKADAgECAhQAhISAspFYesZAEeqH7wyL/
aQKBjBGBgkqhkiG9w0BAQowOaAPMA0GCWCGSAF1AwQCAwUAoRwwGgYJKoZIhvcNAQEIMA0GCWCGSAF1AwQCAwUAogMCASCjAwIBATC
BjjELMAkGA1UEBhMCVVMxEDAOBgNVBAgTB0Zsb3JpZGExFzAVBgNVBAcTDkNhcGUgQ2FuYXZlcmFsMRgwFgYDVQQKEw9UcnVzdCBUa
GUgUHJlc3MxOjA4BgNVBAMTMVRydXN0IFRoZSBQcmVzcyBSb290IENlcnRpZmljYXRlIDEgQXV0aG9yaXR5R5IDIwMjAwIhgPMjAyMDA
3MTQwMjEyNTZaGA8yMDQ1MDcxNTAyMTI1NlowgZwxCzAJBgNVBAYTA1VTMRAwDgYDVQQIEwdGbG9yaWRhMRcwFQYDVQQHEw5DYXB1I
ENhbmF2ZXJhbDEbMBkGA1UEChMPVHJ1c3QgVGh1IFByZXNzMUgwRgYDVQQDEz9UcnVzdCBUaGUgUHJlc3MgUm9vdCBDZXJ0aWZpY2F
0ZSAxIELudGVybWVkaWF0ZSBTZXJ2ZXIgMSAtIDIwMjAwggEiMA0GCSqGSIb3DQEBAQUAA4IBDwAwggEKAoIBAQD////
+e9rYxYJ0UJF+eSMOcM1WH4DLpoUiJwdWBqj31mfU74nM9Ln6X8ZoLJuNJbO/ABC0r7Rije4K/+aae/
2PrS2ncPXcHu+050ErWkg5RCgGCrurSn8LIhCoftNSuyjf4iwWy8elQgrTQWQ5Fpndm0Esp3axImBiGZk5CUvFt6P4/
IYuYQuDUTy17k4rdXc++EMwwz47z0R0nEmWY02LU7XjzzGRwDi9ZiiFEnScUTP583buutcDFnKexYeo6hRV/62/
Pu35TRWq317ShnsG9eZsvnTi4wFkQHHStl614VPQQlrUT39x1fzUAOt64vobAFF2WoXwoF4Z1hWI7U8NAgMBAAGjgeAwgdOwGAYDVR
0RBBEwD4INVHJlc3RUaGVQcmVzczALBgNVHQ8EBAMCAf8wDwYDVR0TBAgwBgEBAQIBADApBgNVHQ4EIgQgQjJl+DRNhUkKEueul6i94
8bQc+90JYWbbc5qW2UrF3ygwKwYDVR0jBCQwIoAgXJ5npcCBBCD7NB3foz/
t60GxB5su5giRBqAHs5HWLecwSwYIKwYBBQUHAQEEPzA9MDsGCCsGAQUFBzABhi9odHRwOi8vRGV2ZVGvzdC5UcnVzdFRoZVByZXNzL
m9yZy9UVFFBfU3J2UnNwLnBocDBGBgkqhkiG9w0BAQowOaAPMA0GCWCGSAF1AwQCAwUAoRwwGgYJKoZIhvcNAQEIMA0GCWCGSAF1AwQ
CAwUAogMCASCjAwIBAQOCAgEAEbh4a8omMUyW13r9DW/1OxAe4zisFdIU+zvp2HMsSYx/
S7rA5xee9ah+Y1AHOsXv3CcknHW52jkULhSetvuBc+Vwxgk/
hHVODGs411uEkuQQpOhJfMEG9Adjs57xG0GPsH2orpmtMFd6IdUa+RRs5uQ0Qb6M6H9XtNvqaWmK7ZjH1ThnzcpJFnBe4iUL53Sbic
vaBZ+70wRrkZU0AFTAFcoTuzntiJGIyBAD5tBxgEGdxIbmtTcwdI8rjaQHg3UXY1x07PCWpTttAIAkgre64rWiVh+b4hlAavpWwNS1
cyhjLFyLRn0f2fwqSjSGKir/IrA5ypZ23UBkyTmMXTmiJX/9mno3dwECaYojAEWiEPSjrysmrrhfzN/
Ac47quDuQXDdV71sfmiCwrJ8mU/v2wfPzZqEnEbXGb23NJxY/
BOMhulds7xDSzfgcSY0rkHUeTDderCbyk+9wjj01vDcEkYDgcmbWhKSG5WYkdJ1prLZ0fJO4Jfoh1mnJ3y5Oswi6qBDtiadMs4+1YP
hHRRKGmF8ewfTfoTlwr8uzmz81/byOzX93HVKcw5EApoqZDUBV7VET9TV7rn2pnFU1VfIKM3SAOPZQfr/
jcqLXixi+NdvS4fiu9ZoJVh4/cOBPJ0wwB+qfJXBAO5S6kgoPXMJ3/8YFynurJKIQSA5NOyPADxj0=" data-cvn_opt="2" data-
cvn_authsgn="qLn3ax1DWLm6h3JzWBAniAQInAHEoTbZ6KN1Y1JocKm7PeDJOo7bre9YIgyDMjleYKijGVPp2vFz4CJmGUIMH136W
4frJtiBuSQP3Kj::5bbsb6JWYSoZWatlV53xD9MZt7HoxlaLAWmb8wAiJCJzb6WK7JBfACZwmrtiHGYH9msEKLq4AeBpO3qr
5JgdpArqGvj9SgWZQQ9PFQbvluT2wNgHUBA93sTqFN+KRwYXbYL3RO5fPAwiXYXyMollw2n6c+p929pE7jrcAijzojPj/
BOoNecnqk0BfYmb2PlkaTwNmpnu/zg4gY1akmZwU9d9nQfcmYbp1PBTw==" oncopy="event.clipboardData.setData('text/
plain',this.outerHTML);event.preventDefault();" style="display: inline-block;">Applications such as
Facebook provide a framework for users to create and share content. Currently th   no viable way
to ensure the source of that content is valid.
Content Layer Security changes that by creating an additional OSI layer that separates the
authentication of content from the application.

An individual author can digitally embed their signature into original content that will be identified
going forward as produced by that author no matter where or how it is shared.</div>
```

FIG. 9B — 902 Content Card Front End

FIG. 9C

CONTENT VALIDATION NETWORK AND ASSOCIATED METHODS

FIELD OF THE INVENTION

The present invention relates to systems and methods for validating and certifying content posted on the internet and otherwise. In particular, the present invention relates to a content validation network and associated methods.

BACKGROUND

Currently there is no reliable means to verify the validity of posted content on the internet. Content can be posted or reposted with another's identity. Content can also be generated and falsely attributed to someone else. Trustworthiness of posted content begins with trusting the source to which it is attributed. Trustworthiness also comes from the posting history of the generating source.

There exists a need in the art to verify the generator of content and embed their identity into their posted content. There exists a need for a network that verifies identity, cross references that validation, and embeds the validated identity into posted content attributed to that entity. Therefore, there exists a need in the art for a content validation network and associated methods.

This background is provided to reveal information believed by the applicant to be of possible relevance to the present invention. No admission is made as to prior art and nothing within the background should be construed as prior art against the present invention.

SUMMARY OF THE INVENTION

Embodiments of the present invention are related to a content validation network comprising a certificate generation engine, a signature engine, a display engine, a certificate status engine, and a digital content card. The certificate generation engine may include a key pair generator structured to create a network user's public and private key and produce a digital certificate authenticating the network user. The certificate generation engine may be structured to embed the public key into the digital certificate. The signature engine may be structured to use the private key to generate the network user's digital signature unique to their digital content card when validated by their digital certificate. The display engine may be structured to validate the network user's digital signature using their digital certificate then display the network user's created digital content card with the network user's digital signature embedded into metadata elements of the digital content card. The certificate status engine may be structured to determine whether the digital signature of the network user's digital content card is valid. The digital content card may be content created by the network user demarcated with a conspicuous border and the network user's identity. The content validation network may also include a stamp engine structured to expedite the display of digital content cards on the display engine by storing and retrieving previously verified digital content cards and bypassing the certificate status engine.

In this embodiment, the digital certificate may be embedded within the network user's digital content card. Furthermore, the generation engine may be structured to attach a validity period to the digital certificate set to expire after a predetermined amount of time. The digital content card may be structured to be signed within the validity period.

The signature engine may be structured to embed a network user's digital signature and content publish date into the network user's digital content card. Furthermore, the display engine may be structured to utilize the embedded content publish date to verify the validity of a digital content card and its corresponding digital certificate. The display engine may further be structured to verify the validity of a digital content card by at least one of cross-referencing its public key, cross-referencing the certificate status engine, and cross-referencing a stamp engine flag indicating pre-checked validation.

A further embodiment of the invention may include the signature engine structured to embed an article tag, an article id, a content publish date, and public key into metadata elements of a network user's digital content card. The front facing portion of the digital content card may be demarcated with a conspicuous border and a portion of the network user's identifying information.

In this embodiment, the signature engine may be structured to embed the digital content card with one or more cross-signatures of verified network users. The digital content card may be structured to be embedded into a single data stream or document along with other digital content cards. The certificate status engine may be structured to permit a network user to remove their digital certificate and signature from the digital content card. Furthermore, the digital content card border may include at least one of the network user's name and the name of the network.

The display engine may be structured to display at least one of a dropdown and popup that may show at least one of an article identifier, publish date, author information, author credentials, digital content card inquiries, and updates on the digital content card's status. Additionally, the digital content card's embedded metadata elements may be structured to be transferable when the digital content card is transferred or republished. Furthermore, the digital content card may be included in a viewer accessible catalog of other digital content cards authored by the same network user. The viewer accessible catalog may include a list of where a particular digital content card is published.

Another embodiment of the invention may include the signature engine structured to cryptographically hash the digital signature and include it in the digital content card metadata elements. The metadata elements may include an article tag, an article id, an article publication date, an author id, an author's encoded digital certificate with public key, and an author's previously hashed and encoded digital signature. Furthermore, the signature engine may be structured to embed digital content cards with one or more cross-signatures of verified network users. The cross signatures may be one of an individual and a business entity. As in other embodiments, the digital content card's embedded metadata elements may be structured to be transferable when the digital content card is transferred or republished.

BRIEF DESCRIPTION OF THE DRAWINGS

FIG. 7A is a representation of html metadata generated by the content validation network according to an embodiment of the invention.

FIG. 7B is a representation of html metadata generated by the content validation network according to an embodiment of the invention.

FIG. 8 is a representation of html metadata generated by the content validation network according to an embodiment of the invention.

FIG. 9A is a prior art representation of general content displayed online.

FIG. 9B is a representation of displayed content generated by the content validation network according to an embodiment of the invention.

FIG. 9C is a representation of displayed content generated by the content validation network according to an embodiment of the invention.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified. Metadata elements in this application are given specific names for the sake of clarity and ease of description. The specific metadata element names are explanatory only and are by no means intended to be limiting. One skilled in the art will understand and appreciate that metadata element names may be substituted without changing their functionality, so long as their functionality is consistent with the description herein. Likewise, HTML is referenced throughout the application, but is intended to be non-limiting as well. Therefore, one skilled in the art will appreciate that XML or the like may be a substitute for HTML. Additionally, the terms network user and author may be interchangeably used in accordance with the context of the given description.

Figure 1:
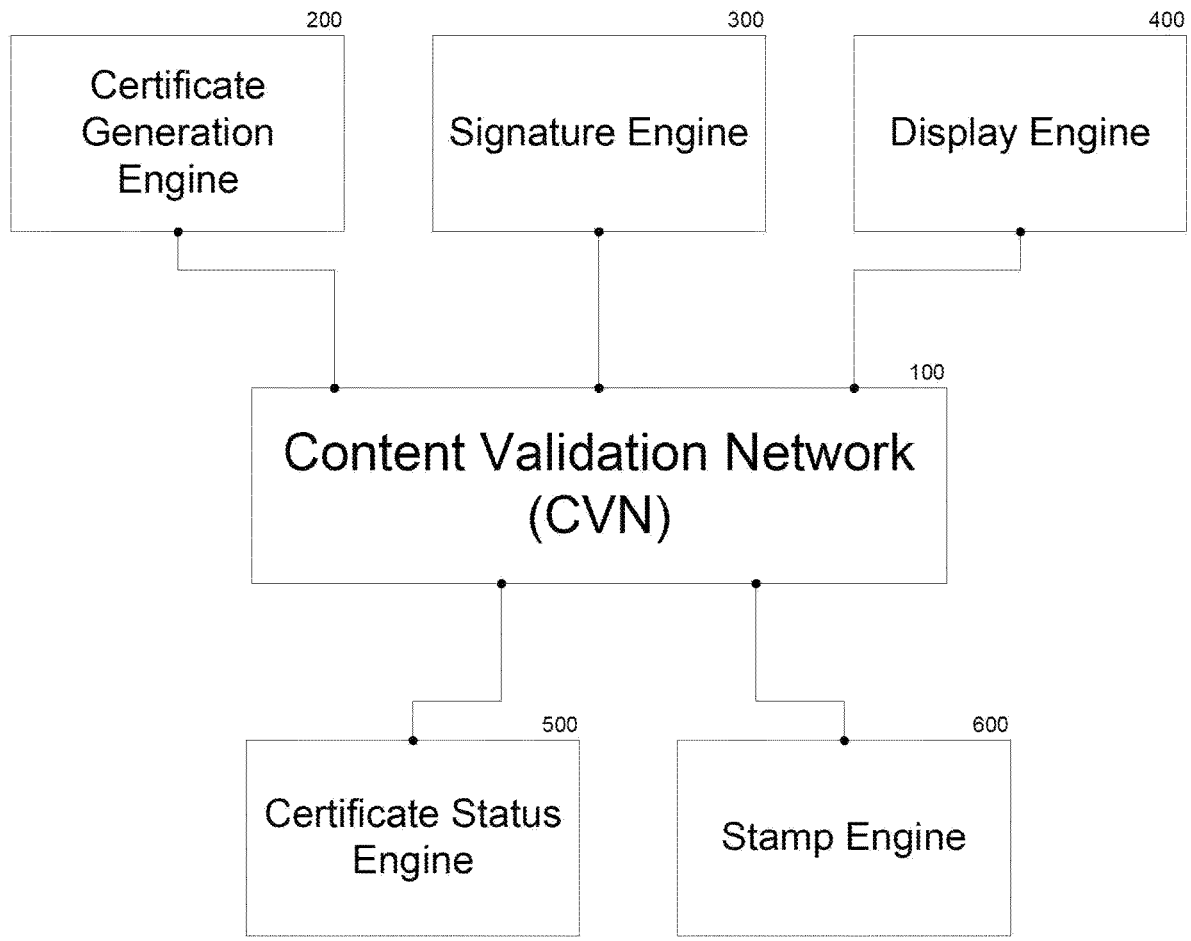
FIG. 1 is a block diagram overview of the content validation network according to an embodiment of the invention.

Referring now to FIG. 1, the content validation network 100, hereinafter referred to as the network 100, may include a certificate generation engine 200, a signature engine 300, a display engine 400, a certificate status engine 500 and a stamp engine 600. These different components of the network 100 all function to create a digital content card with a front and a back, or more specifically a frontend and a backend from a programmatic standpoint. Digital is defined herein as being available in electronic form and readable and manipulable by computer. Furthermore, a digital content card may be specifically identified content displayed within a web browser when viewing it online or within a digital document when viewing it offline. It should be noted that the digital content card may also be used within a web application. By way of non-limiting example, web application may be social media delivery platforms, smart phone applications, and other digital delivery platforms whereby the digital content card is distinguishing delivered author created content.

A digital content card is content created by a network user whereby the visible frontend is demarcated with a conspicuous border and at least a portion of the network user's identifying information, for example their name. In some embodiments, network identifying information may be embedded into the border as well.

Digital content cards also include a backend whereby network user and content identifying information are embedded into the digital content card metadata. The digital content card backend comprises embedded metadata elements with identifying information regarding the displayed frontend content as well as encoded network user information.

The digital content card's embedded metadata elements and visible frontend are structured to be transferable when the digital content card is transferred or republished. Furthermore, the visible information and border added to the digital content card's frontend by the network 100 may only be visible if the digital content card's backend has validated, encrypted, and embedded network user information according to the specifications described hereinafter. Additionally, in some embodiments, digital content cards may be structured to envelope other digital content cards.

Figure 2:
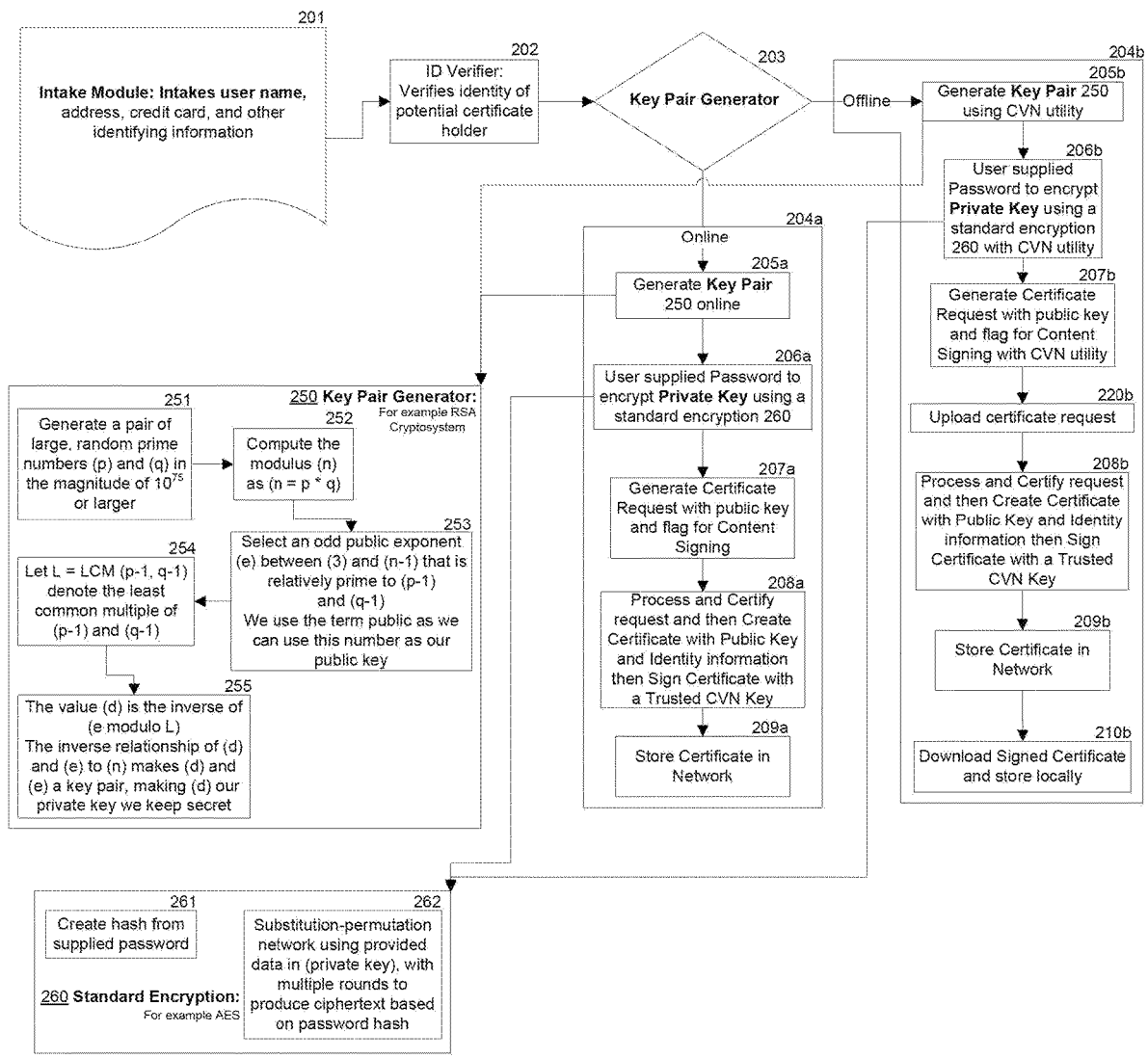
FIG. 2 is a flowchart illustrating a certificate generation engine within the content validation network illustrated in FIG. 1.

FIG. 2 illustrates the certificate generation engine 200 in more detail. This may be the initial stage of the network 100 generating a certificate once a user has been authenticated. A user may then use their certificate to sign and authenticate a digital content card created by that user.

As such, an initial component of the certificate generation engine 200 may be an intake module 201 that may request information from a network user to begin initializing the network 100 to that network user. By way of non-limiting example, network user intake information may include name and contact information, credit card and state identification data, as well as other personal or business information. Once placed into the system 100, an ID verifier 202 may ensure that that the network user is in fact who they represent themselves to be by cross-referencing the intake information against public or private databases. By way of non-limiting example, a network user may be cross referenced against bank records, state identification records, IRS records, and secretary of state records, and the like.

A network 100 API may allow for access to these databases and a comparison algorithm may allow for the submitted information to be cross referenced against what was scraped from these databases. Once a pre-established comparison threshold has been met between network user submitted information and pulled database information, a positive flag may be passed to a key pair generator 203 for processing. Conversely, should the pre-established threshold not be met, a negative flag may be passed to the key pair generator 203 and the user may not be certified.

The key pair generator 203 may be structured to create a network user's public and private key and produce a digital certificate authenticating the network user. In some embodiments, the certificate generation engine 200 is structured to embed the public key into the digital certificate. In further embodiments, the digital certificate may be embedded within the network user's digital content card.

The Key Pair Generator 250 uses public-key cryptography, or asymmetric cryptography. Each pair generated by the key pair generator 250 consists of a public key, which may be known to others, and a private key, which may not be known by anyone except the owner. The generation of such key pairs depends on cryptographic algorithms which are based on mathematical problems termed one-way functions. Effective security requires keeping the private key private. The public key can be openly distributed without compromising security.

The key pair generator 203 creates both a public key and a private key to authenticate a network user and create a certificate. With public-key cryptography, robust authentication is possible. A network user can combine a message with a private key to create a short digital signature on the message. Anyone using the author's corresponding public key can combine that message with a claimed digital signature. If the digital signature matches the message, the origin of the message is verified.

In cryptography, a public key certificate, also known as a digital certificate or identity certificate, is an electronic document used to prove the ownership of a public key. The certificate includes information about the key, information about the identity of its owner (called the subject), and the digital signature of a key trusted by the network 100 that has verified the certificate's contents (called the issuer). If the signature is valid, the date range of the certificate matches the publication date, the issuer's digital signature is valid, and the issuer is trusted by the network 100. It can then use that key to authenticate that a message was digitally signed by the network user. A public-key cryptography algorithm may use prime factorization as the trapdoor one-way function.

$$\text{Modulus}(n) = \text{PrimeRandom1}(p) * \text{PrimeRandom2}(q) \quad \text{Equation 1}$$

In 251 this may define a pair of large random prime numbers, for example (p) and (q), in the magnitude of $10^{75}$ or larger. A Modulus 252 may be computed (n) as a product of (p) and (q) mathematically with equation 1, (n=p*q). An odd public exponent 253 may be selected (e) between (3) and (n-1) that is relatively prime to (p-1) and (q-1). This is tagged as public and acts as the public key available to anyone. The network 100 incorporates this with signed content.

$$L = LCM(p-1, q-1) \quad \text{Equation 2}$$

$$\text{PrivateKey}(d) = \text{inverse of (PublicKey}(e)\text{modulo } L) \quad \text{Equation 3}$$

Continuing with Equation 2, box 254 indicates L=LCM (p-1, q-1) denoting the least common multiple of (p-1) and (q-1). Demonstrated in 255 the private key value (d) is the inverse of (e modulo L), equation 3. The inverse relationship of (d) and (e) to (n) makes (d) and (e) a key pair. This makes (d) the secret private key. This inverse relationship gives the ability to use one key to perform a function and only the inverse key can perform a corresponding function for the desired result.

$$\text{DigitalSignature}(s) = \text{MessageHash}(m)^{PrivateKey(d)} (\text{mod (Modulus}(n))) \quad \text{Equation 4}$$

$$\text{MessageHash}(m) = \text{DigitalSignature}(s)^{PublicKey(e)} (\text{mod (Modulus}(n))) \quad \text{Equation 5}$$

By way of non-limiting example, a message may be converted to a number through a hash function (m). When (m) is taken to the d exponent (d being the private key) then mod by (n) the digital signature (s) is produced, Equation 4. This can then only be verified by the inverse function taken by (m) to the (e public key) exponent and then mod by (n) Equation 5. This produces the message hash (m). This ensures that the only feasible author who signed the message hash must have had the private key (d). Both (p) and (q) are large enough random prime numbers that attempting to reverse engineer them through factorization is a practical impossibility with current computing technology.

Symmetric standard encryption 260, may be used to encrypt the private key for secrecy. A standard symmetrical encryption for example AES, and a private key password may either be created by a network user or automatically generated. Using, for example AES, a hash may be created from the supplied password to be a specific size 261. Then a substitution-permutation network 262 may be used with the data to be protected, in this case the private key, with multiple rounds to produce ciphertext based on the password hash. This encryption protects the private key with a password that is practically impossible to decrypt using current technology.

The key pair generator 203 may actuate through either an online key pair generator 204a or an offline key pair generator 204b. The Key Pair may be generated and maintained via centralized loud server for online signing purposes or may be maintained offline via an installed computing device utility for offline signing purposes.

The online key pair generator 205a may utilize the loud server to create the key pair using Key Pair Generator 250. As block 206 suggests, the private key may be encrypted for secrecy using a Standard Symmetrical Encryption 260. This adds an additional layer of security specifically to the private key. Therefore, the private key may include multilayer protection including a password encryption specific to the private key that is required for a network user to actually utilize the private key, a login required to access the online network 100 where it is stored, and additional two factor authentication such as a cell phone code sent via text messaging.

As block 207a illustrates, when a logged in network user that has either not previously been certified or has an expired certificate wishes to publish verified online content, a request for a certificate may be generated with a flag for content signing 207a. This request may be sent with network user identifying information along with the network user's public key and the (n) modulus that corresponds to their private key from step 205. The network 100 validates the network user based on the information supplied with their login account 208a. If found valid and trustworthy, the network 100 issues an official network certificate with information identifying the network user, a public key and the (n) modulus that the network user provided in step 207a. A flag is then set in the certificate allowing it to be used for content signing purposes. In one embodiment, the certificate generation engine may be structured to attach a validity period to the digital certificate set to expire after a predetermined amount of time. In this embodiment, signing the digital content card must occur within the validity period and the validity check determines if the signature was validly signed within that time.

As shown by block 208a, the network certificate now includes the identifying information, the public key, and modulus therein to serve as a public facing identification of the network user. The certificate is then signed with a private key trusted by the network 100 so the certificate can then be authenticated by everyone as trusted by the network 100. This official network certificate, which is stored within the network 100, is what may be used to validate a logged in network user's content 209a intended for online publishing.

The offline key pair generator 205b may utilize a utility from the network 100 to create the key pair using Key Pair Generator 250. Additionally, as block 206b suggests, the private key may be encrypted for secrecy offline using a Standard Symmetrical Encryption 260.

A request for a certificate may be generated with a flag for content signing 207b. This request is created with a subject equaling network user identifying information along with the network user's public key and the (n) modulus that corresponds to their private key from step 205b. This request is then uploaded 220b to the login account created for 201. The network 100 validates the network user based on the information supplied with their login account 208b. If found valid and trustworthy, the network 100 issues an official network certificate containing a subject equaling information identifying the network user, a public key and the (n) modulus that the network user provided in step 207a and a flag is set in the certificate allowing it to be used for content signing purposes. The network certificate encapsulates the information therein to serve as a public facing identification of the network user 208b. The certificate is then signed with a private key trusted by the network 100 so the certificate can then be authenticated by everyone as trusted by the network 100. This official network certificate, which may be stored within the network 100 and/or embedded into the digital content card, to be used to validate a logged in network user's content 209b intended for online publishing. In some embodiments, the certificate generation engine may be structured to attach a validity period to the digital certificate set to expire after a predetermined amount of time. The certificate is then downloaded back to a network 100 Utility to be stored with the Private Key to be included when content is signed 210b. In some embodiments, signing of the digital content card must occur within the validity period.

In some embodiments, the certificate generation engine 200 as a whole may be represented algorithmically by the following:

$$CrtReq=Proc(Data,DVM,KPG(\ ),Flag)$$
$$Certificate=Sign(CrtReq)$$
$$CertificateChain=Certificate+ParentCertificateChain \qquad \text{Equation 6}$$

Data is data provided by the user.
DVM is the Type of Digital Verification Module utilized to verify digital content cards Signed
Proc is a function to generate a certificate with user supplied user information
KPG is a KeyPair Generator, this consists of a Private Key and a Public Key in an inversely related fashion
Flag is a bit set to indicate this certificate is designated for a digital content card
Sign is a function to create a Certificate Signature, this is generated by using a parent Private Key and Certificate in order to provide verification of the Certificate Authenticity
The plus sign in this instance is concatenation of strings. The order and labels added in the above algorithm are inconsequential.

Figure 3:
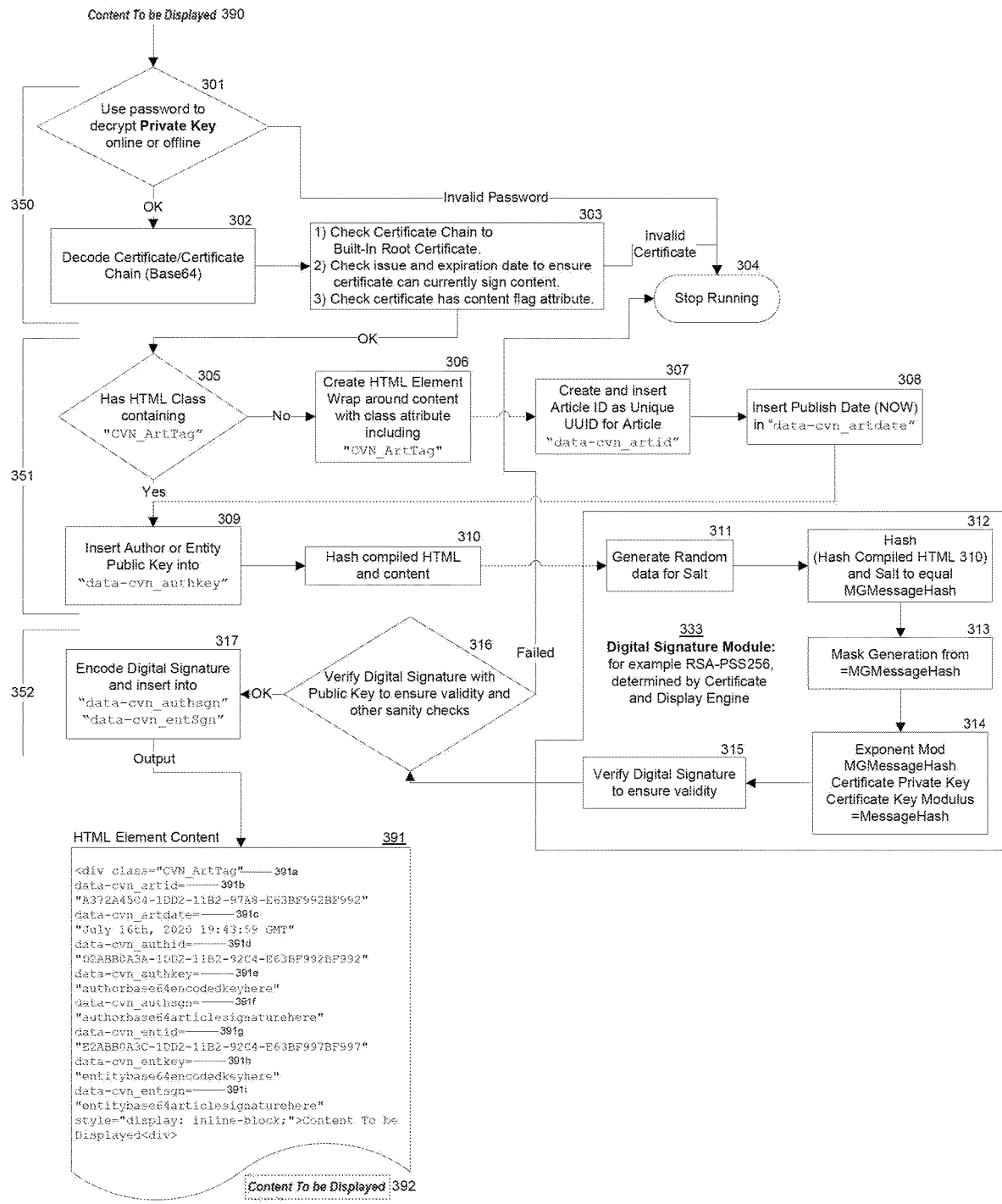
FIG. 3 is a flowchart illustrating a signature engine within the content validation network illustrated in FIG. 1.

FIG. 3 is a flowchart that demonstrates the signature engine 300. The signature engine 300 may provide a network user author the ability to digitally sign content using their private key and certificate and thereby provide proof that the content to be published could only have been authored by that network user. The signature engine 300 may be structured to use the private key to generate the network users digital signature unique to their digital content card when validated by their digital certificate. Furthermore, the signature engine 300 may be structured to embed a network users digital signature and content publish date along with an article tag, an article id, and the digital certificate with embedded public key into metadata elements of a network user's digital content card. The signature engine 300 may further be configured to cryptographically hash the digital signature and include it in the digital content card metadata elements. These metadata elements may include an article tag, an article id, an article publication date, an author id, an author's encoded digital certificate with public key, and an author's previously hashed and encoded signature.

As shown, the initial stage 350 may include decrypting the network user's private key using the password created from 206a, 206b and accessing the private key from 205a and 205b. If an incorrect password is used, then the network 100 may terminate the request 304. If a correct password is used then the network certificate may be decoded 302. By way of non-limiting example, the encoding to be removed may be base64. Base64 encoding is typically used to alter binary code data into a human readable transmittable data format, for example instead of '01000001' a 'QQ==' can be substituted. Decoding base64 involves turning the human readable transmittable data into binary and encoding base64 involves turning binary into human readable transmittable data. Because binary cannot be directly implemented into HTML or the like, decoding the certificate and the certificate chain is necessary. Therefore, the binary numbers are converted into a plain text format that can be included into an HTML web page or the like.

Next, validation of the certificate may include three steps as depicted by block 303. First, a certificate check may be conducted to determine if the network certificate is in fact valid, is signed by a trusted private key implemented by the network 100, or has a lineage to a trusted private key implemented by the network. Second, the issue and expiration date of the network certificate may be cross referenced with the current date to ensure the network certificate has not expired. This enables the network user to publish content with a current date. Third, a check may be made to determine if the network certificate contains the necessary content signing flag attribute embedded therein needed for content signing. If the certificate does not pass these validity checks, the request may be terminated 304 for not including an acceptable network certificate and the network user content may not be validated and signed accordingly.

The next phase of the signature engine 300 may include an html compiler 351 that may wrap and label the content to be published with particularized html tags if not already included with the content.

First, block 305 indicates that a check may be conducted to determine if the content already includes the html class tag identifying that it has already been validated by the network 100. This tag may be labeled "CVN-ArtTag". If the content already includes the tag, insertion of the tag is not necessary and instead the content may be cross-signed with an additional digital signature. Cross-signatures of verified network users may be one of an individual and a business entity. If the content does not include the tag, at this juncture it may continue through to have the tag added 306. The content may be given a unique article ID (UUID or universally unique identifier) and placed within an html tag 307. This tag may be labeled "data-cvn_artid". The content may then be given the current time and date as the published date to be tagged in html 308. This tag may be labeled "data-cvn_artdate".

Block 309 indicates that the author or entity public key may be inserted either after block 305 if the "CVN_ArtTag" is present or after step 308. By non-limiting example, this may be a "data-cvn_authid" tag, which is an ID embedded in the certificate, and then used with the base64 encoded certificate and chain that may be inserted in the "data-cvn_authkey" attribute. As block 310 indicates, the compiled HTML content is now hashed. That is, a cryptographic hash is created based on the entire HTML element compiled to this point.

As suggested by block 333, the digital signature module supporting the Signature Engine 300 may utilize RSAPSS256. Block 333 indicates that the compiled HTML may enter the digital signature engine to add a digital signature to the content to be posted. First, a random value known as a salt is generated to add to the hash created in block 310. The salt ensures that the digital signature is varied upon each call. It also adds an extra layer of security preventing the ability to falsify a digital signature. As indicated by block 312, an additional layer of hashing is added to the previous hash from 310 and the salt created in 311 to further complicate any attempt to falsify a digital signature.

Block 313 shows that the hash from 312 may then be masked along with the salt from 311 to provide a method for the network 100 to verify the digital signature. The digital signature may be created using exponent math, the mask 313, the private key 301 and the modulus.

Figure 4:
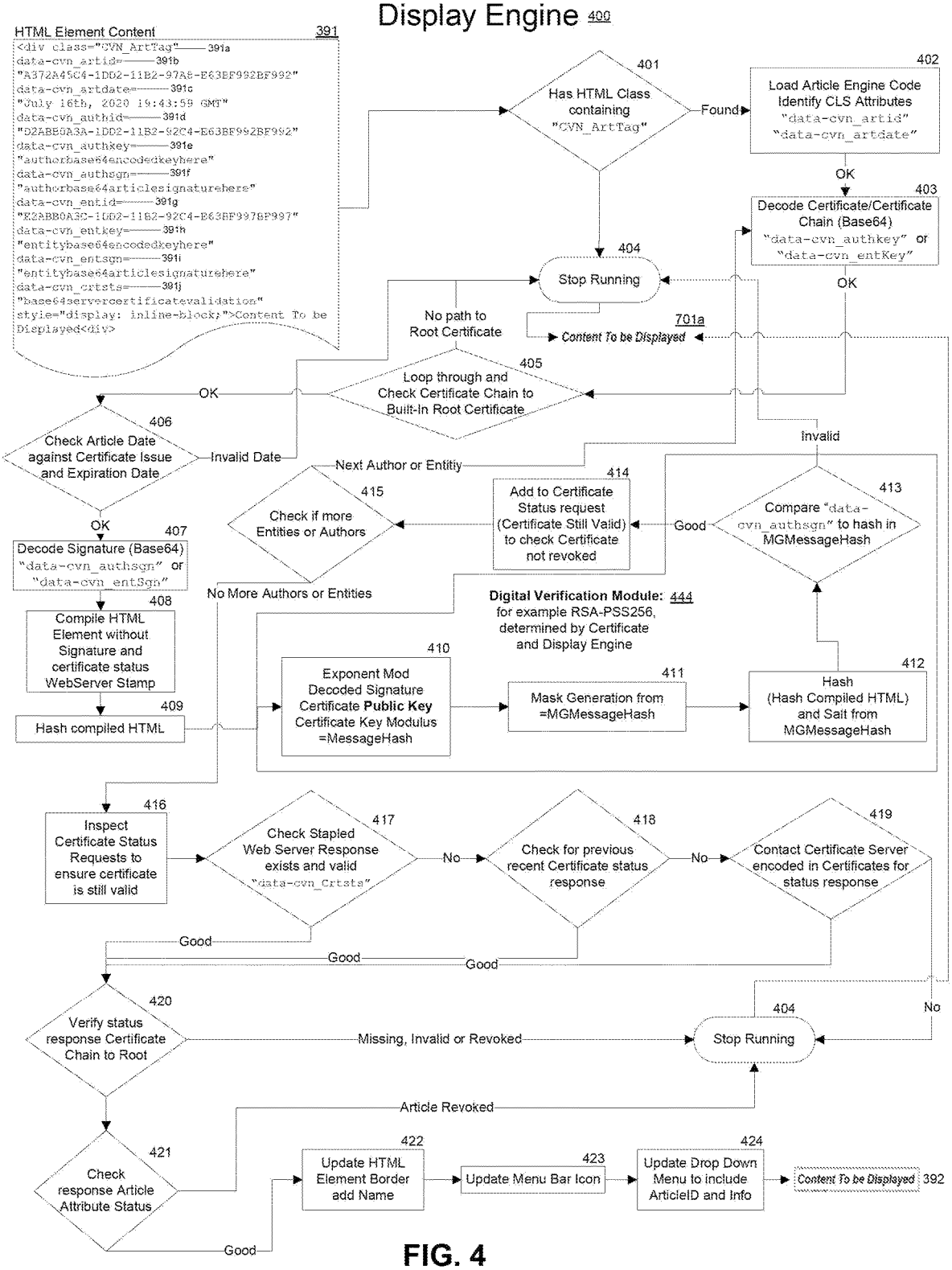
FIG. 4 is a flowchart illustrating a display engine within the content validation network illustrated in FIG. 1.

Blocks 315 and 316 note that the digital signature may be verified following the procedures outlined hereafter in FIG. 4. The digital signature may be verified with the public key to ensure its validity and may be run through other sanity checks as well. If the digital signature verification fails, the network 100 directs the request to a STOP and effectively ends the program 304. However, if it does not fail, then as block 317 indicates, the digital signature may be encoded and inserted into "data-cvn_authsgn" or "data-cvn_entsgn" depending on author or entity for later validation with the Display Engine 400. The HTML output may resemble the display in block 391.

In some embodiments, the signature engine 300 may be represented algorithmically and may generate the digital content card by the following:

MetaDataChunk=("ArticleID:"+*Id*)+("ArticleDate:"+Date)+("AuthorKey:"+Encode(Certificate))
Signature=*DSM*(Hash(MetaDataChunk+Content)) MetaData=MetaDataChunk+("AuthorSignature"+Encode(Signature))
ContentCard=MarkupElement(MetaData+Content)    Equation 7

Id is an Article ID, a unique random identifier to uniquely identify the Article Date is the Article Date, the date at which the Article is Signed, or the Current Date when this Signing occurs Certificate is the Author's Certificate Chain, this is demonstrated above Encode is a function with an inverse that takes a human readable string and converts it to a binary data string, such as base64 encoding/decoding Hash is a one-way function, that is, a function for which it is practically infeasible to invert or reverse the computation DSM is the Digital Signature Module to create an Article Signature, this is generated by decoding the Author's Certificate and creating a digital signature of the content Content is user supplied content intended to be given out to consumers that needs to be verified as a digital content card Digital content card is a Markup Element supplied from this Signature Engine and then transmitted to the consumer to be verified by the Display Engine, that includes Content that is desired to be identified as verifiable The plus sign in this instance is concatenation of strings. The order and labels added in the above algorithm are inconsequential.

FIG. 4 illustrates the display engine 400 that inspects signed certified content and displays it for viewing. It evidences that the digital content card posted could only have been created by the network user author in 300. The display engine 400 may be structured to validate the network user's digital signature using their digital certificate, then display the network user's created digital content card with the network user's digital signature embedded into metadata elements of the digital content card. The display engine 400 may be structured to utilize an embedded content publish date to verify the validity of a digital content card and its corresponding digital certificate. In fact, the display engine 400 may be structured to verify the validity of a digital content card by at least one of cross-referencing its public key, cross-referencing the certificate status engine, and cross-referencing a flag from the stamp engine 600 indicating prechecked validation.

Beginning with block 401, the network 100 may check an entire webpage or any other stream of data in any application running through the network 100 to locate a lass containing the "CVN_ArtTag" tag. If found, block 402 indicates that the code may be loaded into memory to perform validation steps. This keeps the memory profile low while maintaining a high throughput until validation is needed. If not found, the program may be instructed to stop running 404.

Next, the author identifier attribute may be labeled "data-cvn_authid" and may be fetched to decode the author key or author key chain from the "data-cvn_authkey" attribute, 403. Block 405 indicates that the author certificate or author certificate chain is checked to ensure the certificate is signed by private keys trusted by the network 100 with a lineage back to an originally produced network 100 root certificate.

Box 406 indicates a check for the article date. This attribute may be labeled "data-cvn_artdate" and may be used to see that the article date falls between the certificate issue date and certificate expiration date. A certificate may be renewed each year to publish new work. However, the original certificate is still in place to match the time period the work digitally signed using that certificate was published and falls within the "data-cvn_artdate" attribute. As box 407 suggests the "data-cvn_authsgn" attribute may be decoded to retrieve the content signature. Box 408 indicates that the HTML then may be compiled removing the author's signature. This may be labeled "data-cvn_authsgn" and may remove any co author or entity-cross signed attributes. Furthermore, an attribute labeled "data-cvn_crtsts" containing a previous stamped certificate status response from the stamp engine 600, may be removed if there is one. However, this removal may leave the author's attributes included. As indicated by box 409, a cryptographic hash based on the compiled HTML from 408 is created. The HTML is then put through the digital verification module.

In some embodiments, the digital verification module 444, supporting the Display Engine 400, may utilize RSAPSS256. The digital verification module 444 may perform the inverse operation of the digital signature module 333 from FIG. 3.

First, as block 410 indicates, using exponent math, the decoded signature from 407, the decoded certificate's Public Key, and the decoded certificate's modulus from 403, the MessageHash is created using Equation 4. The MessageHash is then run through the Mask Generation function in order to split the salt from the digital signature hash, 411. The compiled HTML from 409 and the salt retrieved from 411 is then hashed, 412. Block 413 indicates that the decoded data-cvn_authsgn" may be compared with the hash generated from 412. If they are not the same then the network is prompted to terminate action 404. If they are equal than the network 100 may continue processing. Block 414 indicates that once the digital signature engine has completed, the HTML is added to the status request to ensure the author's certificate has not been revoked from the Certificate Generation Engine 200 that originally signed the author's certificate. Next, block 415 indicates that the article is checked to see if it is co-signed or cross signed. If so, then the network 100 loops back to block 403 to ensure they are also valid. In some embodiments, the network 100 may first check co-entities, then a single entity, then co authors, then the original author.

Next, block 416 indicates that from each certificate the Certificate Generation Engine 200 used is located to get the Certificate Status Server Flag of each certificate. This dictates which server will be contacted to perform the Certificate Status Check 500. Next, block 417 indicates the network 100 checks to see if there is a "data-cvn_crtsts" attribute. If so, the Certificate Status Response may be decoded. As indicated by block 418, if no "data-cvn_crtsts" attribute exists, the network 100 checks to see if the Display Engine 400 previously stored in cache a Certificate Status Response for this article. Block 419 indicates that if neither block 417 or 418 are true, then the network 100 sends the Certificate Status Request from 414 to the Certificate Status Server 500 found in block 416.

Block 420 indicates that the Certificate Status Response is checked to determine if there is a valid digital signature 444 reply that has been digitally signed 333 with a certificate with a lineage to a root certificate included with the Display Engine 400. Block 421 shows that it may then check the embedded network 100 Article Status Attribute to ensure the article is valid and has not been revoked by the author, co-author, or cross-signing entity.

At this point, as indicated by block 422, the displayed border around posted content may be updated to show that the content was successfully validated. Also included may be an opinion and the author's name or identifier. There is also a check here to ensure that if the item was copied that it includes the entire HTML Element so other Display Engines 400 can validate the content as well. An OnClick function may be used to bring up a Notification proving that the content has been validated. Block 423 denotes that at this stage a menu bar icon may be enabled for each signed content found giving the network user information on the number of articles validated ensuring that a border was not photographically added to spoof validation. Lastly, block 424 indicates that this information may be added for each item in a dropdown menu bar. Furthermore, a link with more information from the network 100 server may include more details about the author, accreditations, other articles, and inquiries about the content.

In some embodiments, the display engine 400 may be represented algorithmically and the following expression may determine if the content is valid and the digital content card can be displayed as verified:

$$Pub=\text{PubKey}(\text{Decode}(\text{Certificate}))\ Dec\text{Sign}=\text{Decode}(\text{Signature})\ \text{MetaDataChunk}=(\text{``ArticleID:''}+\text{ContentCard}\rightarrow Id)+(\text{``ArticleDate:''}+\text{ContentCard}\rightarrow \text{Date})+(\text{``AuthorKey:''}+\text{Decode}(\text{ContentCard}\rightarrow\text{Certificate}))\ DVM(Pub,\text{Hash}(\text{MetaDataChunk}))=(\text{Content is verified})\ \text{OR}\ (\text{Content is }NOT\text{ verified}) \quad \text{Equation 8}$$

Id is an Article ID, a unique random identifier to uniquely identify the Article Date is the Article Date, the date at which the Article is Signed, or the Current Date when this Signing occurs Certificate is the Author's Certificate Key Chain, this is demonstrated above PubKey is a function to return just the Public Key from the Certificate Decode is a function with an inverse that takes a human readable string and converts it to a binary data string, such as base64 encoding/decoding Hash is a one-way function, that is, a function for which it is practically infeasible to invert or reverse the computation Salt is a function specified with certificate to Mask out and split the Randomized Salt from the actual hash value of the message MH is a function specified with certificate to Mask out and split the Hash out from the Randomized Salt of the message DVM is the Digital Verification Module used to check a digital signature of a message, for example RSA-PSS256

Digital content card is a Markup Element supplied from the Signature Engine and then transmitted to the consumer to be verified by the Display Engine. This contains the Element with meta-data containing ID the Author's Signature and content Signature is the author signature inside the digital content card The plus sign in this instance is concatenation of strings. The order and labels added in the above algorithm are inconsequential.

Figure 5:
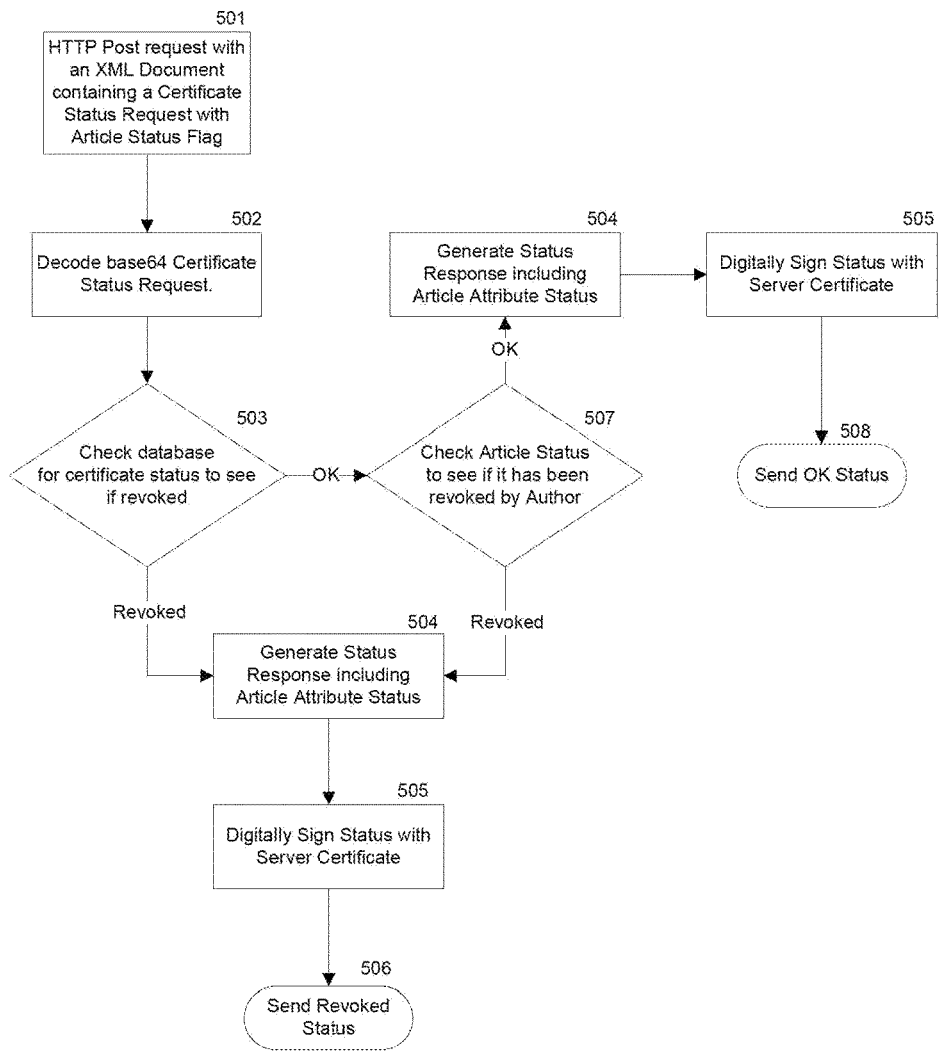
FIG. 5 is a flowchart illustrating a certificate status engine within the content validation network illustrated in FIG. 1.

FIG. 5 depicts a certificate status engine 500 as may be embodied in the invention. The certificate status engine 500 may be structured to determine whether the digital signature of the network user's digital content card is valid. The certificate status engine 500 may respond to status requests in order to validate the certificate from 200. It also may check the article status using an article status attribute to verify if the author revoked an article Digitally Signed from 300. In other words, in some embodiments, the certificate status engine 500 may not only validate a digital content card, but may be configured to permit a network user to remove or revoke their digital certificate and signature from a digital content card should they so choose.

To begin, block 501 indicates that the system may respond to an HTTP post request of an XML Document with an included Certificate Status Request and may include an Article Status Flag to check both the status of the certificate and the article. Next, block 502 indicates it may decode the Certificate Status Request using Base64. Block 503 shows that the certificate database may be checked to determine whether the certificate has been revoked. Next, a status response is generated for the certificate and article, block 504. Block 505 indicates that the status is digitally signed 333 with the server certificate chain to enable the Display Engine 400 or the Stamp Engine 600 to validate a certificate Response Status. The response is sent out to the requestor to provide the Certificate Response Status that the certificate or article has been revoked, block 506. Block 507 indicates that the article status and certificate may be checked using the Display Engine 400 or the Stamp Engine 600 and allows the network user author to revoke an article if desired. Lastly, block 508 indicates that a successful certificate status and article status are then sent to the Display Engine 400 or the Stamp Engine 600. This ensures the Display Engine 400 or the Stamp Engine 600 has current validity information regarding the certificate and article. In some embodiments this may be within a stored cache window of twenty-four hours.

Figure 6:
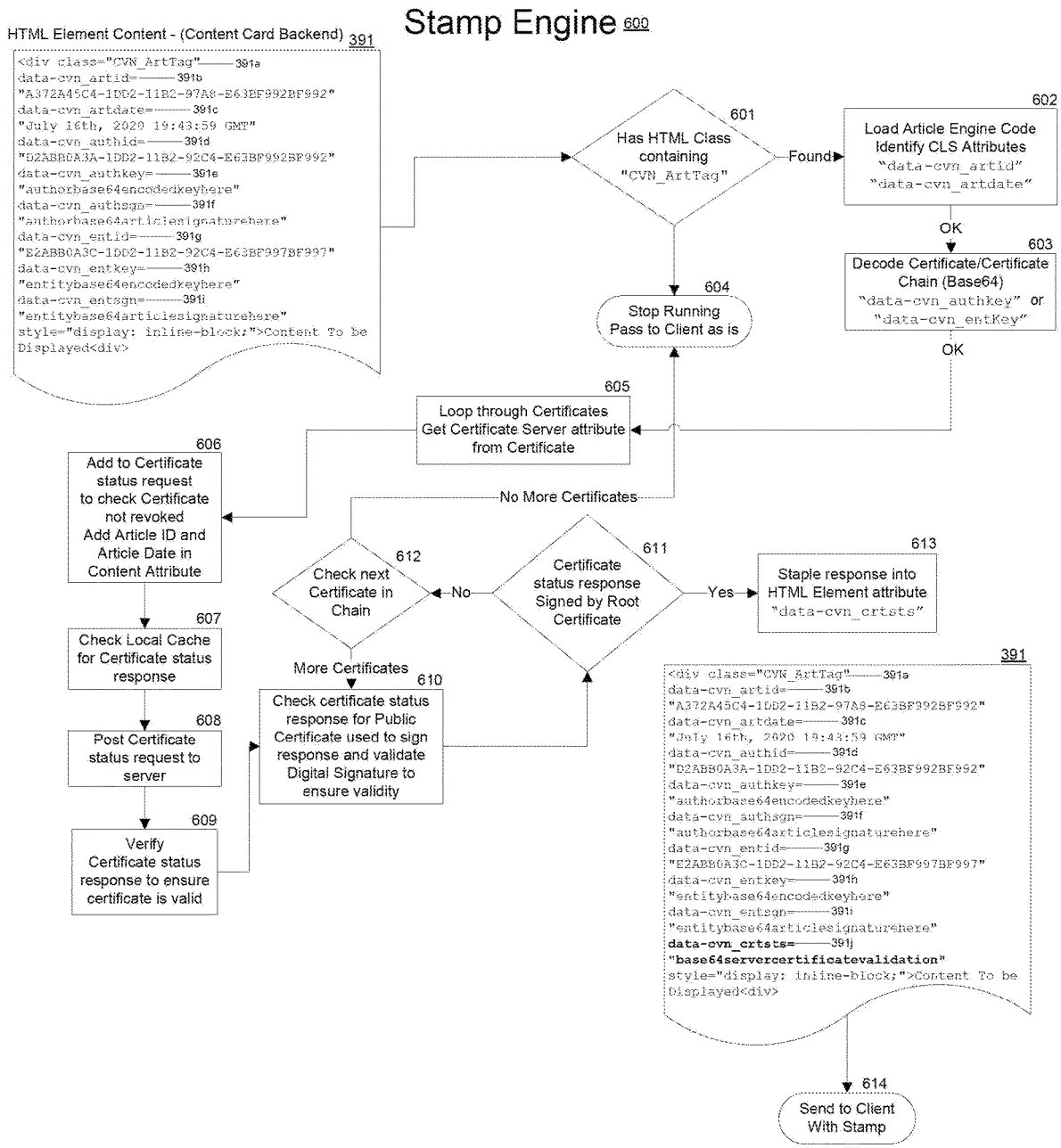
FIG. 6 is a flowchart illustrating a stamp engine within the content validation network illustrated in FIG. 1.

FIG. 6 illustrates the stamp engine 600 within the network 100. The stamp engine 600 allows a Web server to speed up the Display Engine 400 by checking the certificate status of 300. In other words, the stamp engine 600 may be structured to expedite the display of digital content cards on the display engine 400 by storing and retrieving previously verified digital content cards and bypassing the certificate status engine 500. This is because the certificate stamp engine 500 pre-requests the information from the Certificate Status Engine 500 before sending the content out to all Display Engines 400. This in effect pre-caches the status of the Certificate Response thereby saving the Display Engines 400 from having to also contact the Certificate Status Engine 500 during that period.

Block 601 checks the entire page or any other stream of data in any application running validation from the network 100 and locates any class containing the "CVN_ArtTag" tag if any exists. Block 602 illustrates that if the class containing "CVN_ArtTag" is found, the engine code is loaded into memory to perform the validation steps. This keeps the memory profile low and throughput high until validation is needed. Block 603 indicates that the network 100 then retrieves the author identifier that may be labeled "data-cvn_authid" and decodes the author key or author key chain. This attribute may be labeled "data-cvn_authkey". If not found, the action is terminated 604. Block 605 illustrates the network 100 may then loop through to locate the Certificate Generation Engine 200 used for each certificate and gets the Certificate Status Server Flag of each certificate. This tells the server to perform the Certificate Status Request 500.

Block 606 indicates the flag is added to the Certificate Status Request in order to ensure the author's certificate has not been revoked from the Certificate Generation Engine 200 that signed the author's certificate. Block 607 indicates that the server cache is checked for the Certificate Status Response from the Certificate Generation Engine 200 found in 605 above. Then, block 608 shows that the Certificate Status Request is sent from 606 to the Certificate Generation Engine 200 found in 605. Block 609 indicates that the Certificate Status Response is checked to determine if there is a valid reply that has not been revoked.

Next, block 610 shows that the Certificate Status Response is checked to ensure the digital signature is valid. Block 611 checks to see that the Certificate Status Response is a valid reply that has been digitally signed with a certificate chain from a root network 100 certificate included in the Stamp Engine 600. The next certificate in the chain is checked to ensure the entire chain, including all intermediate certificates, are signed properly, block 612. The Certificate Status Response may be encoded from above with, for example Base64, and inserted into the attribute "data-cvn_crtsts", block 613. Lastly, the completed HTML element is sent to the client to be validated with the Display Engine 400.

Figures 9A, 9B, 9C:
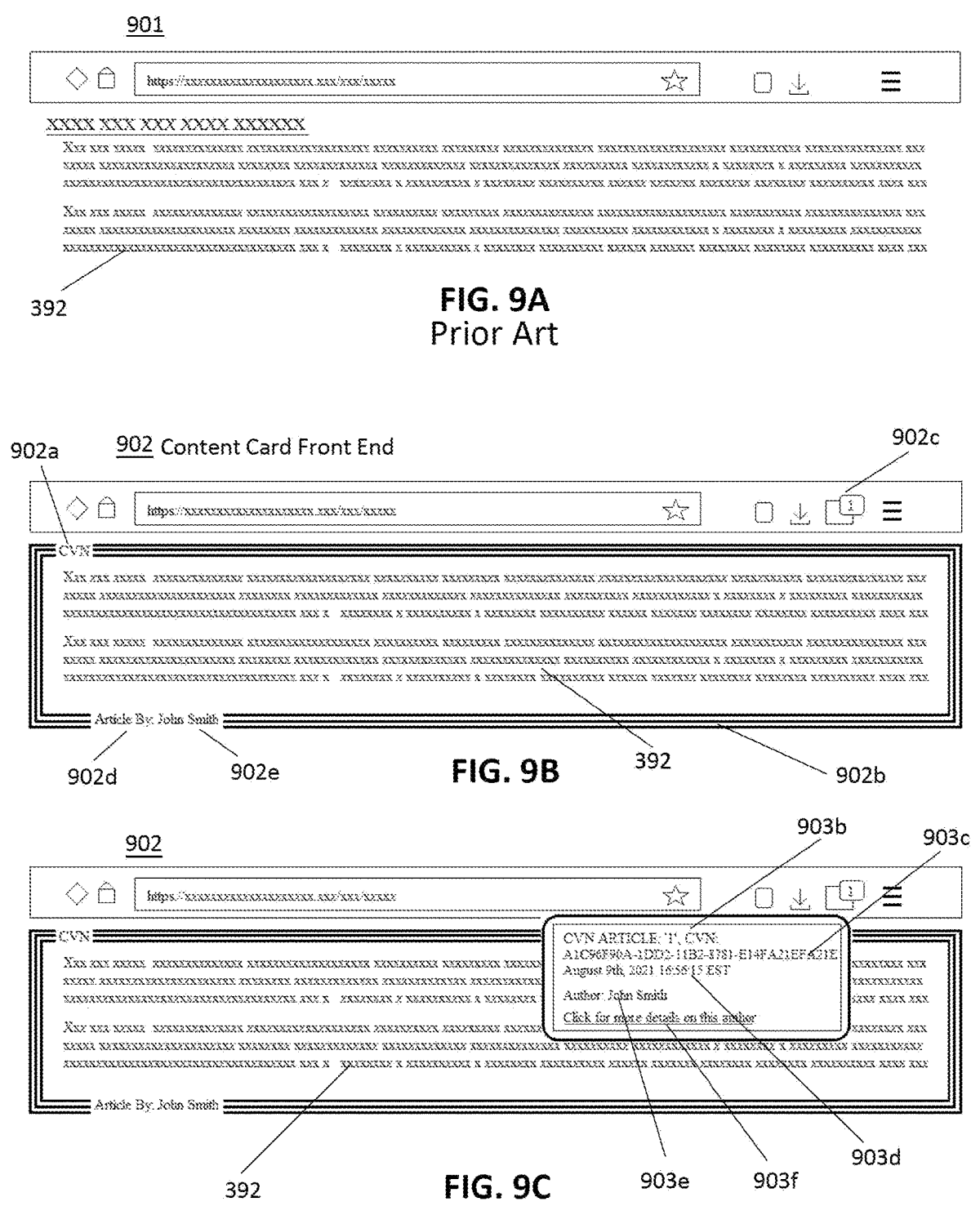

FIGS. 7A, B and 8 illustrate metadata that is embedded into the network user created content defined as the digital content card. While FIGS. 7A, B and 8 illustrate the digital content card backend 391, FIGS. 9B and 9C illustrate the digital content card frontend 902. The digital content card frontend 902 may be the user visible portion displaying network user created content. As previously mentioned, the different components of the network 100 including the certificate generation engine 200, signature engine 300, display engine 400, certificate status engine 500 and stamp engine 600 all function to create a digital content card with a front and a back, or more specifically a frontend 902 and a backend 391 from a programmatic standpoint. Digital content cards may be structured to be embedded into a single data stream or document with other digital content cards.

FIG. 7A is a representation of the HTML metadata generated by the content validation network according to an embodiment of the invention. Plain digital content before any alterations that is waiting to be digitally signed is represented by 390. If a viewer views work that has been digitally signed by a network user as in FIG. 3, but the viewer is not themselves using the network 100, they would see the digital content as plain 390 without any alterations. 391 is a digital content card backend example with HTML elements indicating network 100 attributes for the Display Engine 400 to validate.

391a is an HTML Element with the class containing a "CVN_ArtTag" 391b that acts as an article identifier. An attribute may be labeled "data-cvn_artid" containing a universal unique article identifier to identify content and differentiate it from other article content. 391c shows an article date "data-cvn_artdate" to indicate unequivocally when the content was published by a network user author. 391d shows the author identifier, "data-cvn_authid" to easily decipher the identification of the network user author. 391a is an Author Key "data-cvn_authkey". This is the certificate of the network user author encoded in base64. It may also be a certificate chain which represents the certificates in a chained order tracing back to a root certificate built into the network 100. The network user Author signature "data-cvn_authsgn" is represented by 391f and is the attribute where the author's signature is embedded. This is encoded in base64, verifies that the network Author signed the content and that the content has not been altered. 391g represents an entity identifier "data-cvn_entid" to easily identify the entity. 391h is an example Entity Key "data-cvn_entkey" which is the certificate of the entity encoded in base64. Again, this may also be a certificate chain. 391i is an Entity signature "data-cvn_entsgn" which is the attribute where the entity's signature is embedded. This is encoded in base64 and verifies that the specific entity signed this content.

FIG. 7B illustrates that a digital content card may have multiple cosigners including a plurality of originating authors 391k as well as one or more entities 391l. Additionally, 391j shows that the certificate status response may be labeled "data-cvn_crtsts" embedded by the Stamp Engine 600 to show that the Stamp Engine 600 has pre-checked the certificate to ensure it and the article are current and valid. 391k represents Multiple Co-Authors repeated with a 2-9 behind each attribute for additional author co-signers. This provides a level of cross signing that gives an article more validity by having more digital signatures attached to the article. 391l Multiple Co-Entities repeated with a 2-9 behind each attribute for additional co-entities. In other words, the signature engine 300 may be structured to embed the digital content card with one or more cross-signatures of verified network users. This is done by repeating blocks 305 through 316 of FIG. 3 and embedding the cosigners into the digital content card backend as shown by 391k. This may provide a level of cross-signing that may give a digital content card more validity by having more digital signatures attached to it.

In other words, digital content cards may be signed by multiple authors. This may be done either separately, together, or consecutively. Therefore, in some embodiments, the signature engine may be structured to allow for an author to authenticate a digital content card that has been previously authenticated. This may occur with digital content that has already been verified, in which case the new signature is adding to verification. It may also be when a subsequent network user adds material to the digital content card and signs. Additionally, a network user's work may be cross-signed separately by multiple organizations, combined by multiple organizations.

Furthermore, digital content cards may be cross signed by an organization in order to confirm an organization's agreement to the content. This may be signed separately by multiple organizations, combined by multiple organizations and each signed, or consecutively signed by multiple organizations. Over time, this may compound and provide a trail of trust, much like a title search in property, to increase trustworthiness of content in a layered effect. This layered effect may also allow for a user to only review signatures as far back as preferred, in effect skipping verification steps while verifying content if there is trust with the outer most layer for performance purposes. Again, this is akin to a title search whereby a searcher only needs review the title back to the last provided verified search. Hence, the signature engine may be structured to embed the digital content card with one or more cross-signatures by at least one of an individual network user and multiple organizations signed consecutively or in combination FIG. 8 is a representation of html metadata generated by the network 100 according to an embodiment of the invention. 801 is an example with network 100 attributes complete. 801a is an HTML Element with the class containing the "CVN_ArtTag" tag. 801b is an article identifier attribute that may be labeled "data-cvn_artid". It contains a universal unique article identifier to identify content and differentiate it from other article content. 801c is an article date attribute "data-cvn_artdate" to indicate unequivocally when the content was published by a network user author. 801d is an Author identifier labeled "data-cvn_authid" to easily identify the network user author. 801a is an Author Key labeled "data-cvn_authkey". This is the certificate of the network user author encoded in base64. It may also be a certificate chain which represents the certificates in a chained order tracing back to the ROOT certificate built into the network 100. 801f Author signature "data-cvn_authsgn" is the attribute where the network user author's signature is embedded. This is encoded in base64. This is what ensures the content has not been altered and verifies that the network user Author signed this content. 801g is option data for an article "data-cvn opt". This attribute indicates whether network user co-authors or entities can cross sign this article. 801h HTML Copy Event uses an "oncopy" function to ensure that if any text is copied from the article the entire HTML Element with all validation is copied and kept intact. Therefore, anytime content is copied and pasted the content is still validated by the network 100 and complete. This is what ensures that the digital content card's embedded metadata elements are configured to be transferable when the digital content card is transferred or republished. 801i represents the actual raw content desired to be validated.

FIG. 9A is an example of standard content before digitally signed. If a viewer views digital content 392 that has been digitally signed by a network user, but the viewer is not using the network 100, they would see the digital content 392 as being plain 901 without any alterations.

FIG. 9B illustrates a digital content card frontend 902 showing digital content 392 that has been digitally signed and validated by the network 100. The digital content 392 may include a conspicuous border 902b, here shown with a triple border. In some embodiments, this may include the network name, such as a "CVN" marking, 902a, to help indicate to a viewer that the digital content 392 has been validated by the network 100. The display may also contain a menu bar icon 902c to provide additional network user information. It may also provide proof that the validation is more than simply a graphic on the screen. The "article by" tag 902d and the author's name 902e may appear at the bottom of the digital content 392 within the border 902b as indicated. In some embodiments, this may be anonymous or indicated as an opinion rather than an author's name.

FIG. 9C illustrates an example digital content card with additional dropdown 903a information as shown in 903. The dropdown 903a may include an article identification number 903b, an article identifier 903c, a publish date 903d, author information 903e, as well as a link to more information 903f from the network 100 showing the author's credentials, other verified articles written and published by the author, and digital content card inquiries or other updates on the digital content card's status.

Figure 9D:
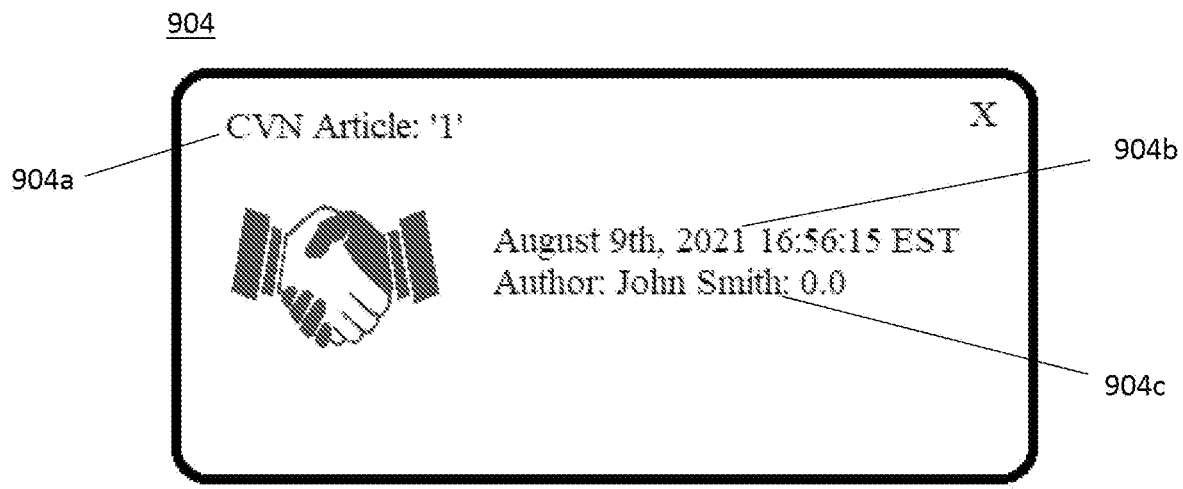
FIG. 9D is a representation of displayed content generated by the content validation network according to an embodiment of the invention.

FIG. 9D illustrates a popup 904 that may illustrate more information about an article. The popup 904 may include an article identification number 904a, an article published date 904b, author name information 904c, and co-author, entity or cross-signer information 904d.

In some embodiments, a webpage popup 905 may be displayed when more information is requested. This may give complete reference and background information about a digital content card. It may include a lookup title 905a, article and author information 905b, as well as other information including other digital content cards written by the author 905c, similar articles, or anything else pertinent to viewing the credibility of content verified by the network 100. In some embodiments, other information 905c may include digital content card reviews and author reviews. In some embodiments, the popup 905 may include at least one of an article identifier, publish date, author information, author credentials, digital content card inquiries, and updates on the digital content card's status.

Figure 9E:
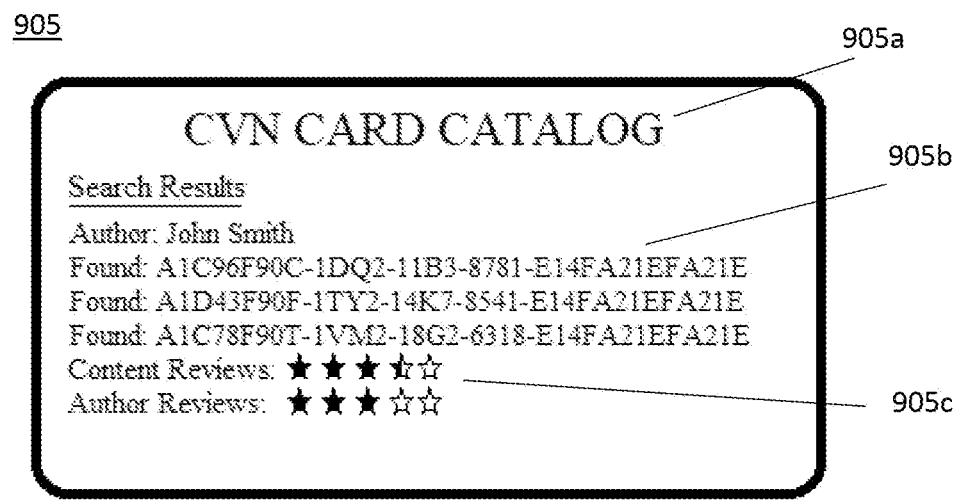
FIG. 9E is a representation of displayed content generated by the content validation network according to an embodiment of the invention.

FIG. 9E illustrates that in some embodiments, the digital content card may be structured to be included in a viewer accessible catalog of other digital content cards authored by the same network user. The viewer accessible catalog may include a list of where a particular digital content card is published.

That which is claimed is:

1. A content validation network comprising:
a certificate generation engine;
a signature engine;
a display engine;
a certificate status engine; and
a content card;
wherein the certificate generation engine comprises a key pair generator configured to create a network user's public and private key and produce a digital certificate authenticating the network user;
wherein the private key is configured to be used by the network user to sign their content; and
wherein the public key is configured to validate the network user's signature by verifying a digital certificate;
wherein the certificate generation engine is configured to embed the public key into the digital certificate;
wherein the signature engine is configured to embed an article tag, an article id, a content publish date, and public key into metadata elements of a network user's content card;
wherein the signature engine is configured to use the private key to attach the network user's digital signature to their content;
wherein the display engine is configured to validate the network user's digital signature then
display the network user's created content with the network user's digital signature embedded into metadata elements of the content card;
wherein the certificate status engine is configured to determine whether a digital signature is valid at the time of network user content creation;
wherein the content card is content created by the network user demarcated with a conspicuous border and the network user's identity; and
wherein said content is verified to not have been altered and verification of the author that generated the content exists.

2. The content validation network of claim 1, further including a stamp engine wherein the stamp engine is configured to expedite the display of content cards on the display engine by storing and retrieving previously verified content cards and caching the certificate status engine's status response.

3. The content validation network of claim 1, wherein the certificate generation engine is configured to attach a validity period to the digital certificate set to expire after a predetermined amount of time.

4. The content validation network of claim 1, wherein the signature engine is configured to embed a network user's digital signature and content publish date into a network user's content card.

5. The content validation network of claim 4, wherein the display engine is configured to utilize the embedded content publish date to verify the validity of a content card and its corresponding digital certificate.

6. The content validation network of claim 5, wherein the display engine is further configured to verify the validity of a content card by at least one of cross-referencing its public key, cross-referencing the certificate status engine, and cross-referencing a stamp engine flag indicating prechecked validation.

7. A content validation network comprising:
a certificate generation engine;
a signature engine;
a display engine;
a certificate status engine; and
a content card;
wherein the certificate generation engine comprises a key pair generator configured to create a network user's public and private key and produce a digital certificate authenticating the network user;
wherein the private key is configured to be used by the network user to sign their content; and
wherein the public key is configured to validate the network user's signature by verifying a digital certificate;
wherein the certificate generation engine is configured to embed the public key into the digital certificate;
wherein the signature engine is configured to embed an article tag, an article id, a content publish date, and public key into metadata elements of a network user's content card;
wherein the signature engine is configured to use the private key to attach the network user's digital signature to their content when validated by their digital certificate;
wherein the display engine is configured to validate the network user's digital signature then display the network user's created content with the network user's digital signature embedded into metadata elements of the content card;
wherein the certificate status engine is configured to determine whether a digital signature is valid at the time of network user content creation;
wherein the content card is content created by the network user demarcated with a conspicuous border and a portion of the network user's identifying information; and
wherein said content is verified to not have been altered and there exists verification of the author that generated the content.

8. The content validation network of claim 7, wherein the signature engine is configured to embed the content card with one or more cross-signatures of verified and network users.

9. The content validation network of claim 7, wherein the content card is configured to be embedded into a single data stream or document along with other content cards.

10. The content validation network of claim 7, wherein the certificate status engine is configured to permit a network user to remove their digital certificate and signature from the content card.

11. The content validation network of claim 7, wherein the content card border comprises at least one of the network user's name and the name of the network.

12. The content validation network of claim 7, wherein the display engine is configured to display at least one of a dropdown and popup illustrating at least one of an article identifier, publish date, author information, author credentials, content card inquiries, and updates on the content card's status.

13. The content validation network of claim 7, wherein the content card's embedded metadata elements are configured to be transferable when the content card is transferred or republished.

14. The content validation network of claim 7, wherein the content card is included in a viewer accessible catalog of other content cards authored by the same network user.

15. The content validation network of claim 14, wherein the viewer accessible catalog comprises a list of where a particular content card is published.

16. A content validation network comprising:
a certificate generation engine;
a signature engine;
a display engine;
a certificate status engine; and
a content card;
wherein the certificate generation engine comprises a key pair generator configured to create a network user's public and private key and produce a digital certificate authenticating the network user,
wherein the private key is configured to be used by the network user to sign their content; and
wherein the public key is configured to validate the network user's signature by verifying a digital certificate;
wherein the certificate generation engine is configured to embed the public key into the digital certificate;
wherein the signature engine is configured to embed an article tag, an article id, a content publish date, and public key into metadata elements of a network user's content card;
wherein the signature engine is configured to cryptographically hash the content card metadata elements;
wherein the signature engine is configured to use the private key to attach the network user's digital signature to their content when validated by their digital certificate;
wherein the display engine is configured to validate the network user's digital signature then display the network user's created content with the network user's digital signature embedded into metadata elements of the content card;
wherein the certificate status engine is configured to determine whether a digital signature is valid at the time of network user content creation;
wherein a content card is content created by the network user demarcated with a conspicuous border and a portion of the network user's identifying information; and
wherein said content is verified not to have been altered, and verification of the author that generated the content exists.

17. The content validation network of claim 16, wherein the metadata elements comprise an article tag, an article ID, an article publication date, an author ID, an author's encoded public key, and an author's encoded signature.

18. The content validation network of claim 16, wherein the signature engine is configured to embed content cards with one or more cross-signatures of verified and network users; and wherein a cross signature may be one of an individual and a business entity.

19. The content validation network of claim 16, wherein the content card's embedded metadata elements are configured to be transferable when the content card is transferred or republished.

* * * * *